Oct. 7, 1924.
H. S. SATTERLEE
METHOD OF IDENTIFYING DOCUMENTS
Filed Oct. 1, 1921
1,511,042
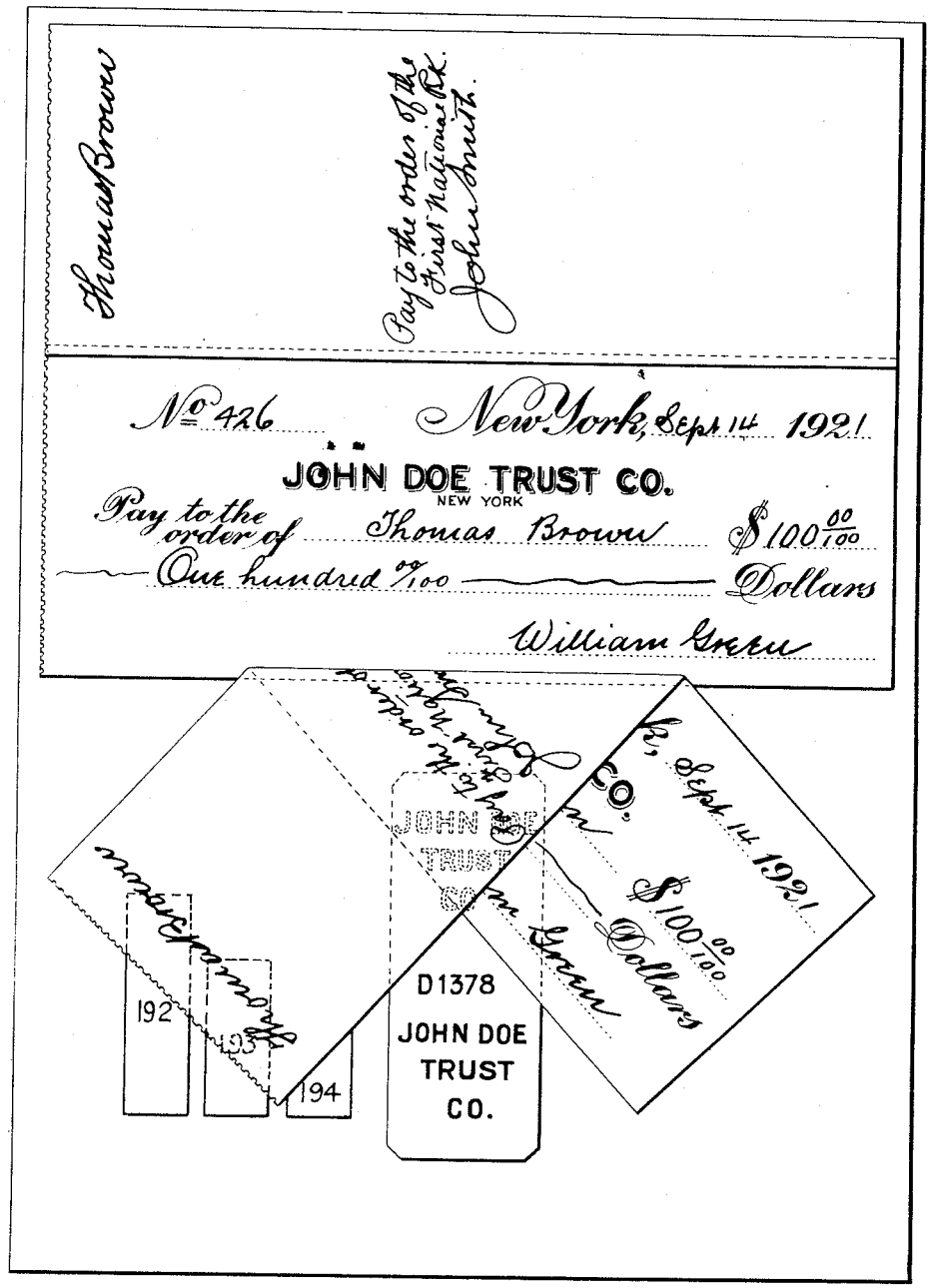

UNITED STATES PATENT OFFICE.

HENRY S. SATTERLEE, OF NEW YORK, N. Y.

METHOD OF IDENTIFYING DOCUMENTS.

Application filed October 1, 1921. Serial No. 504,613.

*To all whom it may concern:*

Be it known that I, HENRY S. SATTERLEE, a citizen of the United States, and a resident of the city, county, and State of New York, have invented an Improvement in Methods of Identifying Documents, of which the following is a specification.

My invention relates to means for photographically copying documents and for identifying the document photographed. My invention is particularly applicable to cases in which the document bears inscriptions on both sides and for that reason it is desirable to identify the face with the back of the document.

I have chosen to illustrate my invention in connection with an ordinary bank check, and the drawing is an illustrative diagram showing the manner in which my method is carried out.

Assuming that it is desired to copy the check shown in such a way as to show both the face and the endorsement thereof, and to identify the copy of the face of the check with the copy of the endorsement: The check is placed upon a black background which will not reflect light, in proper relation with a suitable photographic apparatus. The background may have painted thereon a suitable indicating sign, such as the "John Doe Trust Company", as shown, and may also show an identifying number or other device which serves as a record or file number of the document photographed. In addition to the identifying device, I may include in the background, a suitable numerical or pictorial device which is changed at each exposure.

The face of the check is photographed in one portion of the photographic field on the first exposure and the check is then turned to present the back of the check to exposure in a second portion of the field. The back of the check is preferably overlapped slightly over the margin of the field for the face to facilitate measurement of the dimensions of the check and a second exposure is made upon the same plate or film as the first. The check is then folded as indicated in the lower part of the figure, to display a portion of both the face and the back of the check and placed in a third portion of the photographic field, partially covering the identifying mark on the background. A third exposure is then made upon the same plate or film. The result is a single exposure of the face, a single exposure of the back, a single exposure of the folded document through which the portion shown in dotted lines in the drawing of the indicating mark shows, a double exposure at the overlapping margins of the face and back and at the margin of the face overlapped by the folded document. The indicating mark has received a double exposure of the portion shown by the dotted lines, and a triple exposure of the remaining portion. This serves as a photographic check of the triple exposure practiced in making the negative as evidenced by a comparison of the densities.

By this method it will be seen that both the face and back can readily be compared and identified with the signature and endorsement simultaneously displayed on the folded document, and the identifying mark showing through the folded portion of the document will serve to identify the entire series of photographs.

My invention may be otherwise varied without departing from its spirit and I therefore do not intend to confine myself to the precise details described.

What I claim is:

1. The method of identifying documents, which comprises successively photographing upon the same sensitized element the face and the back of a document and photographing upon said sensitized element at each exposure an identifying mark.

2. The method of identifying documents, which comprises successively photographing upon the same sensitized element the face of a document, the back of a document, and the document folded to expose a portion of both face and back and photographing at each exposure an identifying mark.

3. The method of identifying documents, which comprises successively photographing the two faces of a document and a portion of both faces thereof and photographing at each exposure an identifying mark, a portion of said identifying mark being covered by the document during one exposure thereof.

4. The method of identifying documents, which comprises successively photographing upon the same sensitized element the face and the back thereof and the document folded in such a manner as to expose a portion of both face and back, each of the said exposures overlapping one of the preceding exposures and photographing at each exposure an identifying mark, a portion of said identifying mark being covered during the last exposure.

In testimony whereof, I have signed my name to this specification this 29th day of September, 1921.

HENRY S. SATTERLEE.